United States Patent
Kim et al.

(10) Patent No.: US 9,530,991 B2
(45) Date of Patent: Dec. 27, 2016

(54) VISCOUS SEALING GLASS COMPOSITIONS FOR SOLID OXIDE FUEL CELLS

(71) Applicants: MO-SCI CORPORATION, Rolla, MO (US); THE CURATORS OF THE UNIVERSITY OF MISSOURI, Columbia, MO (US)

(72) Inventors: Cheol Woon Kim, Rolla, MO (US); Richard K. Brow, Rolla, MO (US)

(73) Assignees: MO-SCI Corporation, Rolla, MO (US); The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 14/346,619

(22) PCT Filed: Jul. 23, 2013

(86) PCT No.: PCT/US2013/051691
§ 371 (c)(1),
(2) Date: Mar. 21, 2014

(87) PCT Pub. No.: WO2014/018536
PCT Pub. Date: Jan. 30, 2014

(65) Prior Publication Data
US 2015/0125780 A1 May 7, 2015

Related U.S. Application Data

(60) Provisional application No. 61/674,692, filed on Jul. 23, 2012.

(51) Int. Cl.
| | | |
|---|---|---|
| *C03C 3/064* | (2006.01) | |
| *C03C 8/02* | (2006.01) | |
| *C03C 8/24* | (2006.01) | |
| *H01M 8/0282* | (2016.01) | |
| *H01M 2/06* | (2006.01) | |
| *C03C 8/04* | (2006.01) | |
| *C03C 3/066* | (2006.01) | |
| *C03C 3/068* | (2006.01) | |
| *H01M 8/02* | (2016.01) | |
| *H01M 8/12* | (2016.01) | |

(52) U.S. Cl.
CPC .............. *H01M 2/065* (2013.01); *C03C 3/064* (2013.01); *C03C 3/066* (2013.01); *C03C 3/068* (2013.01); *C03C 8/02* (2013.01); *C03C 8/04* (2013.01); *C03C 8/24* (2013.01); *H01M 8/0282* (2013.01); *H01M 8/0286* (2013.01); *C03C 2207/04* (2013.01); *H01M 8/0206* (2013.01); *H01M 2008/1293* (2013.01); *H01M 2300/0074* (2013.01); *Y02E 60/50* (2013.01); *Y02E 60/525* (2013.01)

(58) Field of Classification Search
CPC ............ C03C 3/064; C03C 3/066; C03C 8/02; C03C 8/04; C03C 8/24; H01M 2/065; H01M 8/0206; H01M 8/0282; H01M 8/0286
See application file for complete search history.

(56) References Cited

U.S. PATENT DOCUMENTS

| | | | |
|---|---|---|---|
| 5,453,331 A | 9/1995 | Bloom et al. | |
| 5,637,261 A | 6/1997 | Mattox | |
| 5,922,444 A * | 7/1999 | Tsuzuki | .............. C03C 3/064 428/220 |
| 6,124,224 A * | 9/2000 | Sridharan | .............. C03C 8/24 204/424 |
| 6,362,119 B1 | 3/2002 | Chiba | |
| 7,897,530 B2 | 3/2011 | Liu et al. | |
| 2005/0147866 A1 | 7/2005 | Ko et al. | |
| 2006/0063057 A1* | 3/2006 | Weil | .............. C03C 8/24 429/495 |
| 2006/0063659 A1 | 3/2006 | Xue et al. | |
| 2009/0318278 A1 | 12/2009 | Mayumi et al. | |

OTHER PUBLICATIONS

International Search Report, PCT/US2013/051691, dated Dec. 30, 2013, 5 pages.
Written Opinion, PCT/US2013/051691, dated Dec. 30, 2013, 11 pages.
International Preliminary Report on Patentability, PCT/US2013/051691, dated Jan. 27, 2015, 9 pages.
Meinhardt et al., "Synthesis and properties of a barium aluminosilicate solid oxide fuel cell glass-ceramic sealant", Journal of Power Sources, 2008, 182, pp. 188-196.
Yang et al., "Chemical Compatibility of Barium-Calcium-Aluminosilicate-Based Sealing Glasses with the Ferritic Stainless Steel Interconnect in SOFCs", Journal of the Electrochemical Society, 2003, 150(8), pp. A1095-A1101.
Ley et al., "Glass-ceramic sealants for solid oxide fuel cells: Part I. Physical properties", Journal of Materials Research, Jun. 1996, vol. 11, No. 6, pp. 1489-1493.
Brochu et al., "Comparison between barium and strontium-glass composites for sealing SOFCs", Journal of the European Ceramic Society, 2006, vol. 26, Issue 15, pp. 3307-3313.

* cited by examiner

*Primary Examiner* — Elizabeth A Bolden
(74) *Attorney, Agent, or Firm* — Senniger Powers LLP

(57) ABSTRACT

A sealant for forming a seal between at least two solid oxide fuel cell components wherein the sealant comprises a glass material comprising $B_2O_3$ as a principal glass former, BaO, and other components and wherein the glass material is substantially alkali-free and contains less than 30% crystalline material.

21 Claims, 9 Drawing Sheets

VISCOUS SEALING GLASS COMPOSITIONS FOR SOLID OXIDE FUEL CELLS

REFERENCE TO RELATED APPLICATIONS

This application is a U.S. national stage application of International Patent Application No. PCT/US2013/051691, filed Jul. 23, 2013, and claims the benefit of U.S. Provisional Application No. 61/674,692, filed Jul. 23, 2012, the entire disclosures of which are incorporated herein by reference.

STATEMENT OF GOVERNMENT INTEREST

This invention was made with United States government support under grants DE-SC0002491 awarded by the Department of Energy. The United States government has certain rights in the invention.

FIELD OF THE INVENTION

This invention relates to solid oxide fuel cells; and in particular to seals to prevent mixing of fuel and oxidant streams and to seal the cell stack to the system manifold in solid oxide fuel cells.

BACKGROUND OF THE INVENTION

Solid oxide fuel cells (SOFCs) are multi-layered structures formed primarily of high-purity metal oxides, including an ionic conducting electrolyte, which generate electricity from the electrochemical oxidation of a fuel source. Planar SOFC configurations are relatively simple to manufacture and have greater power densities and efficiencies than other configurations, but require hermetic seals to prevent mixing of the fuel and oxidant streams within the cell stack and to seal the stack to the system manifold.

The seals must have a low electrical conductivity and must be chemically and mechanically stable in a high temperature reactive environment (moist reducing and/or oxidizing conditions). The seals should exhibit no deleterious interfacial reactions with other cell components, should be created at a low enough temperature to avoid damaging cell components (under 900° C. for some materials), and should not migrate or flow from the designated sealing region during sealing or cell operation because of any applied load.

In addition, the sealing system should be able to withstand thermal cycling between the operational temperature and room temperature. That is, thermal stresses that develop because of mismatches in the thermal contraction characteristics of the different SOFC materials must either be reduced to well below the failure strengths of the materials or must be relieved in some fashion. Although it is possible to design rigid glass-ceramics with coefficient of thermal expansion (CTE) characteristics that are compatible with other SOFC materials (e.g., yttria-stabilized zirconia (YSZ), ferritic stainless steels such as SS441, and alumina (as a coating material on ferritic steels)), and are stable over a long period of time at the operational temperature, stresses can still develop because of in-plane temperature gradients during operation and thermal cycling. If these stresses lead to cracks in the rigid glass seal or at one of the seal interfaces, the operational integrity of the SOFC is compromised.

Currently available glass seals for SOFCs are mostly based on glass-ceramics which turn into a rigid ceramics after crystallization at the SOFC operational temperature, 650-850° C. These rigid glass seals may have intrinsic flaws that are hard to eliminate and can be detrimental when CTE is not matched. Compliant glass seals have been developed as a means to overcome the limitations of the rigid sealants. These glass seals, however, contain alkali elements that may cause undesirable reactions with other SOFC components, or contain expensive precious metals such as silver. Attempts have been made to develop viscous glass sealants for SOFCs, but these attempts use gallium and/or germanium that may limit the commercialization due to their high costs.

SUMMARY OF THE INVENTION

In one aspect the invention is directed to a sealant for forming a seal between at least two solid oxide fuel cell components wherein the sealant comprises a glass material comprising $B_2O_3$ as a principal glass former, BaO, optionally $SiO_2$, optionally $Al_2O_3$, optionally one or more alkaline earth oxides selected from CaO, SrO, and MgO, and optionally a transition metal oxide selected from among ZnO, $La_2O_3$, and $ZrO_2$; and wherein the glass material is substantially alkali-free.

The invention is also directed to a solid oxide fuel cell comprising a sealant for forming a seal between at least two solid oxide fuel cell components wherein the sealant comprises a glass material comprising $B_2O_3$ as a principal glass former, BaO, optionally $SiO_2$, optionally $Al_2O_3$, optionally one or more alkaline earth oxides selected from CaO, SrO, and MgO, and optionally a transition metal oxide selected from among ZnO, $La_2O_3$, and $ZrO_2$; and wherein the glass material is substantially alkali-free.

The invention is also directed to a ferritic steel interconnect in an SOFC comprising a sealant between at least two solid oxide fuel cell components wherein the sealant comprises a glass material comprising $B_2O_3$ as a principal glass former, BaO, optionally $SiO_2$, optionally $Al_2O_3$, optionally one or more alkaline earth oxides selected from CaO, SrO, and MgO, and optionally a transition metal oxide selected from among ZnO, $La_2O_3$, and $ZrO_2$; and wherein the glass material is substantially alkali-free.

Other objects and features of the invention will be in part apparent and in part pointed out hereinafter.

DESCRIPTION OF PREFERRED EMBODIMENTS

Figure 1A:
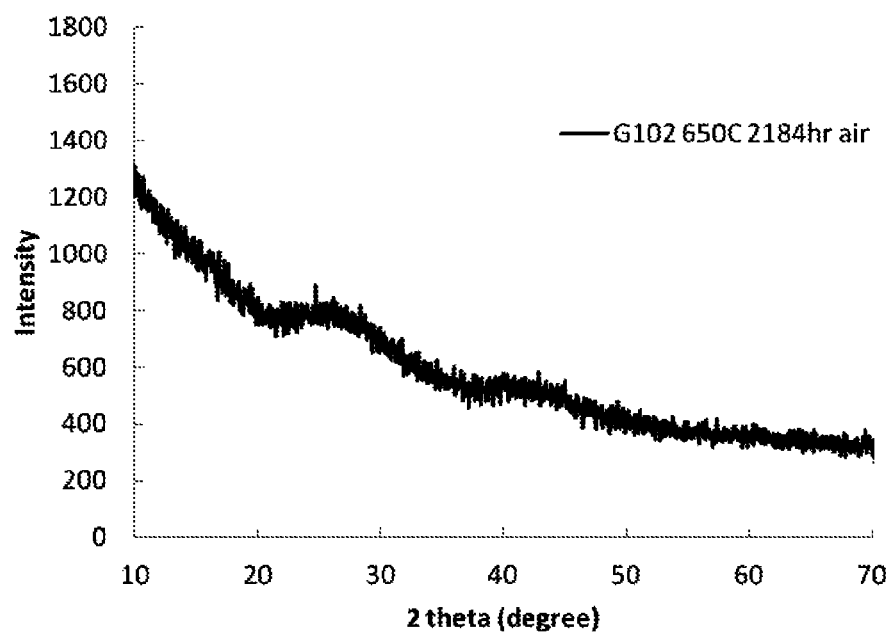
FIG. 1 is an X-ray diffraction (XRD) analysis of a glass-based material of the invention after isothermal heat treatments.

The use of viscous glass seals provides one means of reducing the risk that thermal stresses will result in catastrophic failures, and may provide a means for the seal to recover if cracks do form. The viscosity of the viscous glass seal at the operational temperature should be low enough (e.g., <$10^8$ Pa-s) for the seal to exhibit liquid-like properties, including viscous relaxation. This contrasts with rigid glass seals which either possess glass transition temperatures above the SOFC operational temperature, or are crystallized to the extent that they exhibit no viscous relaxation. On heating the seal above glass transition temperatures ($T_g$), the glass becomes viscous and any flaws within the seal (or at a seal interface) heal because of viscous flow. In addition to providing a means to repair cracks in a seal caused by thermal stresses, the use of a viscous seal could also reduce the magnitude of those stresses compared with a rigid glass seal with the same thermal expansion characteristics, since the stresses will be relieved at temperatures above $T_g$ in the viscous glass seal, reducing the effective $\Delta T$ over which thermal stresses develop.

This invention describes the glass compositions that (a) possess viscosity-temperature characteristics that are compatible with sealing requirements and that allow for stress relaxation and self-healing without excessive flow, under pressure, that would compromise seal integrity; (b) are chemically compatible with SOFC components and so do not alter the thermo-mechanical stability of the seal by forming deleterious interfacial reaction products; (c) avoid the significant volatilization of glass constituents under the SOFC operational conditions that has been associated with other sealing materials, and so alter the viscous properties of the seal or the performance of the SOFC; (d) exhibit promising hermetic sealing and self-healing behavior under SOFC operational conditions.

The sealant compositions of the invention function as a seal in ferritic steel interconnects in SOFCs, such as between components in a SOFC such as stainless steel components and oxide components. Oxide components include, for example, components made from yttria-stabilized zirconia (YSZ). Stainless steel components include, for example, components made from stainless steels such as SS441 or Crofer® 22 APU. Stainless steel SS441 has a nominal composition (in wt %) of 0.03 max C, 1.0 max Mn, 0.04 max P, 0.015 max S, 17.5-18.5 Cr, 9×C+0.3 to 1.0 0.45 Nb, 0.1-0.6 Ti, and balance Fe.

Viscous glass compositions of the invention are alkali-free glasses having compositions from the BaO—RO—$Al_2O_3$—$B_2O_3$—$SiO_2$ system where RO represents other alkaline earth or transition metal oxides. The compositions comprise $B_2O_3$ as a principal glass former in a concentration of between 20 and 65 mol %, for example between 40 and 60 mol % $B_2O_3$ in one preferred embodiment. In preferred embodiments the borate concentration is carefully controlled to above 40 mol % in order to maintain a low liquidus temperature so that under SOFC operation conditions, the glass is viscous (not rigid).

The compositions comprise from 10 to 40 wt % BaO, for example between 10 and 25 mol % BaO in one preferred embodiment. The inventors have discovered that BaO in this range facilitates an increased coefficient of thermal expansion (CTE) to match that of SOFC components to be joined. If the BaO concentration is more than 25 mol %, the liquidus temperature of glass in the context of these formulations tends to increase to more than 850° C., contrary to a critical goal of this invention to have a liquidus temperature which is within the operating range of the SOFC, and therefore less than, for example, 850° C. It has been discovered that in comparison to other CTE modifiers such as SrO, the BaO is less susceptible to unwanted crystallization.

The compositions also include optionally $SiO_2$ in an amount of up to 30 mol %. In some preferred embodiments, the $SiO_2$ content is from 10 to 25 mol %, such as from 12 to 22 mol %. The inventors have discovered that of $SiO_2$ in this range in these compositions reduces the reactivity of the borate-based glass by increasing viscosity of the overall borate-based composition. $Al_2O_3$ may optionally be included in the range of from 0 to 20 mol %, such as from 2 to 10 mol %, to help prevent crystallization of the glass. Certain preferred embodiments have from 2 to 10 mol % $Al_2O_3$, such as from 2 to 7 mol % $Al_2O_3$. At amounts up to 10 mol %, in the context of these overall formulations, $Al_2O_3$ helps to prevent crystallization. But at amounts over 10 mol %, it tends to promote crystallization.

Alkaline earth oxides selected from CaO (0 to 15 mol %, such as from 2 to 10 mol %), SrO (0 to 15 mol %, such as from 2 to 10 mol %, and 2 to 7 mol % in some preferred embodiments), and MgO (0 to 5 mol %) may also be included to increase the CTE. The compositions may comprise between 2 and 10 mol % each of one or more of said alkaline earth oxides selected from the group consisting of CaO, SrO, and WO. The compositions may further comprise 1 to 10 mol % of one or more oxides selected from ZnO, $La_2O_3$, and $ZrO_2$. The ZnO has been discovered to lower the liquidus temperature to within the desired range in many of the compositions. The $La_2O_3$, and $ZrO_2$ help increase the CTE. One preferred embodiment comprises 40 to 60 mol % $B_2O_3$, 15 to 25 mol % BaO, 10 to 25 mol % $SiO_2$, 2 to 10 mol % $Al_2O_3$, 2 to 10 mol % CaO, and 2 to 10 mol % SrO.

The glass seal materials of the invention are substantially alkali-free, and preferably completely alkali-free. All embodiments of the invention are substantially alkali-free in that they contain, for example, no more than 0.5 mol % cumulatively of alkali oxides such as $Li_2O$, $Na_2O$, and $K_2O$. In one embodiment, the cumulative concentration of $Li_2O$, $Na_2O$, and $K_2O$ is less than 0.5 mol %, such as less than 0.1 mol %. In one such embodiment, there is no $Li_2O$, $Na_2O$, or $K_2O$. The presence of the alkali oxides in the viscous glass seal materials of the invention is minimized or avoided because these alkali materials are highly volatile at operational temperature (e.g., 650-850° C.) and the volatilized species can contaminate other SOFC components. Moreover, alkali materials cause lower electrical resistivity, whereas the sealing glass should be an electrically insulator.

The alkali materials are also avoided because they promote unwanted crystallization. The glasses are designed to resist crystallization at SOFC operational temperatures of 650-850° C. Some of the compositions of the invention resist crystallization, but after long-term heat treatment develop partial crystallization. They are still referred to as "glass" herein because the majority of the material is non-crystalline. That is, the glass material claimed herein is not necessarily 100% non-crystalline unless otherwise indicated. These compositions comprise glass and crystallized material below the range where viscosity is substantially affected, such as no more than 30 vol. % crystallization, or such as no more than 15 vol. % crystallization. This partial crystallization may not be significantly detrimental to overall sealing performance; i.e., partial crystallization is tolerable in certain applications. Other of the compositions of the invention such as exemplary glass 102 completely resist crystallization, and do not crystallize upon heating. After more than 2000 hours at 800° C., the preferred glasses (e.g., Glass 102) of the present invention do not form any crystalline Ba-boroalumino-silicate phase.

The seal composition of the invention has a glass transition temperature ($T_g$) and the softening temperature ($T_s$) below the operational temperature of the SOFC for which it is intended, for example of less than about 650° C. The liquidus temperature (TO is generally less than 900° C., such as less than 850° C. The seal composition of the invention preferably has a coefficient of thermal expansion between about 7 and about 10 (40-500° C.) ($\times 10^{-6}$/° C.). The volatilization rate of the seal composition is less than $1.7 \times 10^{-8}$ g/mm²/hr in stagnant dry air at 750° C., such as less than about $4.8 \times 10^{-9}$ g/mm²/hr. The seal composition of the invention preferably has a viscosity at 725° C. of less than $10^{6.6}$ Pa-s, such as less than about $10^6$ Pa-s in some embodiments.

Exemplary glass compositions (Tables 1-4) and their properties (Tables 5-7) are presented in the following tables.

TABLE 1

| Glass ID | Composition (mol %) | | | | | | | | | |
|---|---|---|---|---|---|---|---|---|---|---|
| | BaO | $B_2O_3$ | $SiO_2$ | $Al_2O_3$ | CaO | SrO | MgO | ZnO | $La_2O_3$ | $ZrO_2$ |
| 28 | 20.00 | 60.00 | — | 10.00 | 10.00 | — | — | — | — | — |
| 42 | 25.00 | 55.00 | — | 10.00 | 10.00 | — | — | — | — | — |
| 43 | 30.00 | 50.00 | — | 10.00 | 10.00 | — | — | — | — | — |
| 44 | 15.00 | 65.00 | — | 10.00 | 10.00 | — | — | — | — | — |
| 45 | 10.00 | 60.00 | — | 10.00 | 10.00 | 10.00 | — | — | — | — |
| 46 | 15.00 | 60.00 | — | 10.00 | 10.00 | 5.00 | — | — | — | — |
| 47 | 20.00 | 55.00 | — | 10.00 | 10.00 | 5.00 | — | — | — | — |
| 48 | 20.00 | 50.00 | — | 10.00 | 10.00 | 10.00 | — | — | — | — |
| 49 | 20.00 | 60.00 | — | 10.00 | — | — | — | 10.00 | — | — |
| 50 | 20.00 | 60.00 | — | 10.00 | 5.00 | — | — | 5.00 | — | — |
| 51 | 10.00 | 60.00 | — | 10.00 | 10.00 | 5.00 | — | 5.00 | — | — |
| 52 | 20.00 | 55.00 | — | 10.00 | 5.00 | 5.00 | — | 5.00 | — | — |
| 53 | 20.00 | 50.00 | — | 10.00 | 10.00 | 5.00 | — | 5.00 | — | — |
| 54 | 25.00 | 60.00 | — | 5.00 | 10.00 | — | — | — | — | — |
| 55 | 20.00 | 60.00 | — | 5.00 | 10.00 | 5.00 | — | — | — | — |

TABLE 2

| Glass ID | Composition (mol %) | | | | | | | | | |
|---|---|---|---|---|---|---|---|---|---|---|
| | BaO | $B_2O_3$ | $SiO_2$ | $Al_2O_3$ | CaO | SrO | MgO | ZnO | $La_2O_3$ | $ZrO_2$ |
| 56 | 15.00 | 60.00 | — | 5.00 | 10.00 | 10.00 | — | — | — | — |
| 57 | 15.00 | 60.00 | — | 7.00 | 10.00 | 8.00 | — | — | — | — |
| 58 | 20.00 | 55.00 | — | 10.00 | 6.00 | 5.00 | — | 4.00 | — | — |
| 59 | 20.00 | 55.00 | — | 10.00 | 7.00 | 5.00 | — | 3.00 | — | — |
| 60 | 20.00 | 55.00 | — | 10.00 | 8.00 | 5.00 | — | 2.00 | — | — |
| 61 | 20.00 | 55.00 | — | 8.00 | 7.00 | 5.00 | — | 5.00 | — | — |
| 62 | 20.00 | 55.00 | — | 6.00 | 9.00 | 5.00 | — | 5.00 | — | — |
| 63 | 20.00 | 55.00 | — | 4.00 | 11.00 | 5.00 | — | 5.00 | — | — |
| 64 | 20.00 | 52.50 | — | 10.00 | 7.50 | 5.00 | — | 5.00 | — | — |
| 65 | 22.50 | 55.00 | — | 7.50 | 5.00 | 5.00 | — | 5.00 | — | — |
| 66 | 35.00 | 20.00 | 25.00 | 5.00 | 5.00 | 5.00 | — | 5.00 | — | — |
| 67 | 25.00 | 55.00 | — | 5.00 | 5.00 | 5.00 | — | 5.00 | — | — |
| 68 | 35.00 | 30.00 | 15.00 | 5.00 | 5.00 | 5.00 | — | 5.00 | — | — |
| 69 | 30.00 | 35.00 | 15.00 | 10.00 | 5.00 | 5.00 | — | — | — | — |
| 70 | 25.00 | 40.00 | 15.00 | 10.00 | 5.00 | 5.00 | — | — | — | — |

TABLE 3

| Glass ID | Composition (mol %) | | | | | | | | | |
|---|---|---|---|---|---|---|---|---|---|---|
| | BaO | $B_2O_3$ | $SiO_2$ | $Al_2O_3$ | CaO | SrO | MgO | ZnO | $La_2O_3$ | $ZrO_2$ |
| 71 | 25.00 | 40.00 | 20.00 | 5.00 | 5.00 | 5.00 | — | — | — | — |
| 72 | 20.00 | 45.00 | 15.00 | 10.00 | 5.00 | 5.00 | — | — | — | — |
| 73 | 20.00 | 45.00 | 20.00 | 5.00 | 5.00 | 5.00 | — | — | — | — |
| 74 | 20.00 | 50.00 | 10.00 | 10.00 | 5.00 | 5.00 | — | — | — | — |
| 75 | 20.00 | 50.00 | 15.00 | 5.00 | 5.00 | 5.00 | — | — | — | — |
| 76 | 20.00 | 55.00 | 5.00 | 10.00 | 5.00 | 5.00 | — | — | — | — |
| 77 | 20.00 | 55.00 | 10.00 | 5.00 | 5.00 | 5.00 | — | — | — | — |
| 78 | 20.00 | 45.00 | 20.00 | — | 7.50 | 7.50 | — | — | — | — |
| 79 | 20.00 | 50.00 | 15.00 | — | 7.50 | 7.50 | — | — | — | — |
| 80 | 20.00 | 50.00 | 10.00 | 5.00 | 7.50 | 7.50 | — | — | — | — |
| 81 | 20.00 | 55.00 | 10.00 | — | 7.50 | 7.50 | — | — | — | — |
| 82 | 20.00 | 45.00 | 20.00 | 2.00 | 6.50 | 6.50 | — | — | — | — |
| 83 | 20.00 | 50.00 | 15.00 | 2.00 | 6.50 | 6.50 | — | — | — | — |
| 84 | 20.00 | 55.00 | 10.00 | 2.00 | 6.50 | 6.50 | — | — | — | — |
| 85 | 20.00 | 40.00 | 20.00 | 10.00 | 5.00 | 5.00 | — | — | — | — |
| 86 | 20.00 | 40.00 | 17.50 | 7.50 | 5.00 | 5.00 | 5.00 | — | — | — |

TABLE 4

| Glass ID | Composition (mol %) | | | | | | | | | |
|---|---|---|---|---|---|---|---|---|---|---|
| | BaO | $B_2O_3$ | $SiO_2$ | $Al_2O_3$ | CaO | SrO | MgO | ZnO | $La_2O_3$ | $ZrO_2$ |
| 87 | 20.00 | 45.00 | 22.00 | 5.00 | 3.00 | 5.00 | — | — | — | — |
| 88 | 20.00 | 45.00 | 24.00 | 5.00 | 1.00 | 5.00 | — | — | — | — |
| 89 | 20.00 | 45.00 | 20.00 | 7.00 | 3.00 | 5.00 | — | — | — | — |
| 90 | 20.00 | 45.00 | 20.00 | 9.00 | 1.00 | 5.00 | — | — | — | — |
| 91 | 20.00 | 45.00 | 20.00 | 2.50 | 5.00 | 5.00 | — | — | 2.50 | — |
| 92 | 20.00 | 45.00 | 20.00 | — | 5.00 | 5.00 | — | — | 5.00 | — |
| 93 | 20.00 | 45.00 | 20.00 | 5.00 | — | 5.00 | 5.00 | — | — | — |
| 94 | 20.00 | 45.00 | 20.00 | 5.00 | 4.00 | 4.00 | — | — | — | 2.00 |
| 95 | 20.00 | 45.00 | 20.00 | 5.00 | 3.00 | 3.00 | — | — | — | 4.00 |
| 96 | 20.00 | 40.00 | 25.00 | 5.00 | — | 5.00 | 5.00 | — | — | — |
| 97 | 20.00 | 40.00 | 25.00 | 5.00 | — | 5.00 | — | 5.00 | — | — |
| 98 | 20.00 | 45.00 | 20.00 | 10.00 | — | 5.00 | — | — | — | — |
| 99 | 20.00 | 45.00 | 20.00 | 10.00 | — | — | — | 5.00 | — | — |
| 100 | 20.00 | 45.00 | 20.00 | 7.00 | — | — | — | 8.00 | — | — |
| 101 | 20.00 | 45.00 | 15.00 | 10.00 | — | — | — | 10.00 | — | — |
| 102 | 18.00 | 45.00 | 24.00 | 6.00 | 3.50 | 3.50 | — | — | — | — |
| 103 | 16.50 | 45.25 | 8.25 | 18.00 | 6.00 | 6.00 | — | — | — | — |
| 104 | 19.15 | 47.88 | 25.53 | — | 3.72 | 3.72 | — | — | — | — |
| 105 | 18.56 | 46.39 | 24.74 | 3.09 | 3.61 | 3.61 | — | — | — | — |

TABLE 5

| | Properties | | | |
|---|---|---|---|---|
| Glass ID | Glass Transition Temperature (° C.) | Softening Temperature (° C.) | Coefficient of Thermal Expansion (40-500° C.) (×$10^{-6}$/° C.) | Liquidus Temperature (° C.) |
| 28 | 581 | 615 | 7.48 | 795 |
| 42 | 572 | 597 | 8.56 | 835 |
| 43 | 563 | 586 | 9.42 | >850 |
| 44 | 561 | 600 | 8.01 | 790 |
| 45 | 597 | 617 | 7.84 | 790 |
| 46 | 581 | 604 | 8.20 | 787 |
| 47 | 565 | 599 | 8.86 | >850 |
| 48 | 567 | 600 | 9.69 | >850 |
| 49 | 546 | 575 | 7.68 | 770 |
| 50 | 573 | 604 | 7.24 | 790 |
| 51 | 558 | 587 | 7.66 | 805 |
| 52 | 553 | 589 | 8.79 | <770 |
| 53 | 558 | 592 | 9.60 | >840 |
| 54 | 581 | 614 | 9.88 | >850 |
| 55 | 596 | 625 | 8.43 | 840 |

TABLE 6

| | Properties | | | |
|---|---|---|---|---|
| Glass ID | Glass Transition Temperature (° C.) | Softening Temperature (° C.) | Coefficient of Thermal Expansion (40-500° C.) (×$10^{-6}$/° C.) | Liquidus Temperature (° C.) |
| 56 | 599 | 624 | 8.89 | >850 |
| 57 | 599 | 616 | 8.40 | >850 |
| 58 | 563 | 592 | 8.52 | 795 |
| 59 | 558 | 593 | 8.50 | 790 |
| 60 | 565 | 596 | 8.22 | 795 |
| 61 | 561 | 594 | 8.59 | 790 |
| 62 | 572 | 604 | 8.50 | 845 |
| 63 | 582 | 611 | 9.03 | >850 |
| 64 | 562 | 592 | 8.89 | 835 |
| 65 | 560 | 588 | 8.82 | 845 |
| 66 | 569 | 609 | 11.40 | >850 |
| 67 | 573 | 601 | 9.34 | >850 |
| 68 | 550 | 588 | 11.00 | >850 |
| 69 | 568 | 602 | 9.66 | >850 |
| 70 | 591 | 626 | 8.63 | >850 |

TABLE 7

| | Properties | | | |
|---|---|---|---|---|
| Glass ID | Glass Transition Temperature (° C.) | Softening Temperature (° C.) | Coefficient of Thermal Expansion (40-500° C.) (×$10^{-6}$/° C.) | Liquidus Temperature (° C.) |
| 71 | — | — | — | >850 |
| 72 | — | — | — | >850 |
| 73 | 624 | 640 | 8.48 | 800 |
| 74 | 591 | 616 | 8.19 | 840 |
| 75 | 623 | 650 | 8.17 | 810 |
| 76 | 573 | 604 | 7.06 | 795 |
| 77 | 625 | 656 | 9.25 | 810 |
| 78 | 635 | 657 | 9.11 | >850 |
| 79 | 644 | 656 | 9.03 | >850 |
| 80 | 608 | 631 | 9.26 | >850 |
| 81 | 627 | 651 | 8.96 | >850 |
| 82 | 632 | 648 | 8.46 | >850 |
| 83 | 619 | 644 | 8.46 | >850 |
| 84 | 615 | 647 | 7.95 | >850 |
| 85 | 604 | 645 | 7.21 | >850 |
| 86 | 596 | 645 | 7.35 | >850 |
| 87 | 616 | 662 | 7.05 | 825 |
| 88 | 609 | 653 | 6.61 | 850 |
| 89 | 611 | 662 | 6.52 | 835 |
| 90 | 607 | 657 | 7.08 | >850 |
| 91 | 628 | 672 | 8.39 | >850 |
| 92 | 639 | 682 | 8.92 | >850 |
| 93 | 595 | 644 | 8.03 | 790 |
| 94 | 603 | 649 | 8.15 | >850 |

TABLE 7-continued

| Glass ID | Glass Transition Temperature (° C.) | Softening Temperature (° C.) | Coefficient of Thermal Expansion (40-500° C.) (×10⁻⁶/° C.) | Liquidus Temperature (° C.) |
|---|---|---|---|---|
| 95 | 599 | 659 | 8.09 | >850 |
| 96 | 608 | 659 | 7.83 | 800 |
| 97 | 590 | 647 | 7.78 | 795 |
| 98 | 589 | 643 | 7.60 | >850 |
| 99 | 560 | 611 | 7.10 | >850 |
| 100 | 555 | 611 | 7.74 | 790 |
| 101 | 562 | 613 | 7.43 | >850 |
| 102 | 604 | 639 | 7.25 | Not Crystallizing |
| 103 | 573 | 615 | 8.08 | >850 |
| 104 | — | — | — | — |
| 105 | 613 | 659 | 7.53 | 835 |

While the materials are described herein as containing various oxides by mol %, those skilled in the art understand that in the final glass composition, the oxide compounds are dissociated, and the specific oxides, e.g., $B_2O_3$, $SiO_2$, etc. are not separately identifiable or even necessarily separately present. Nonetheless, it is conventional in the art to refer to the final composition as containing a given % of the individual oxides, so that is done here. So from this perspective, the compositions herein are on an equivalent basis.

The dilatometric softening points ($T_s$) and the glass transition temperatures ($T_g$) of the glasses are generally under 650° C., the lower bound of the SOFC operating temperature. The glasses generally do not crystallize in a differential scanning calorimeter (DSC) when heated at a rate of 10° C./min up to 1,000° C.

Figure 1B:
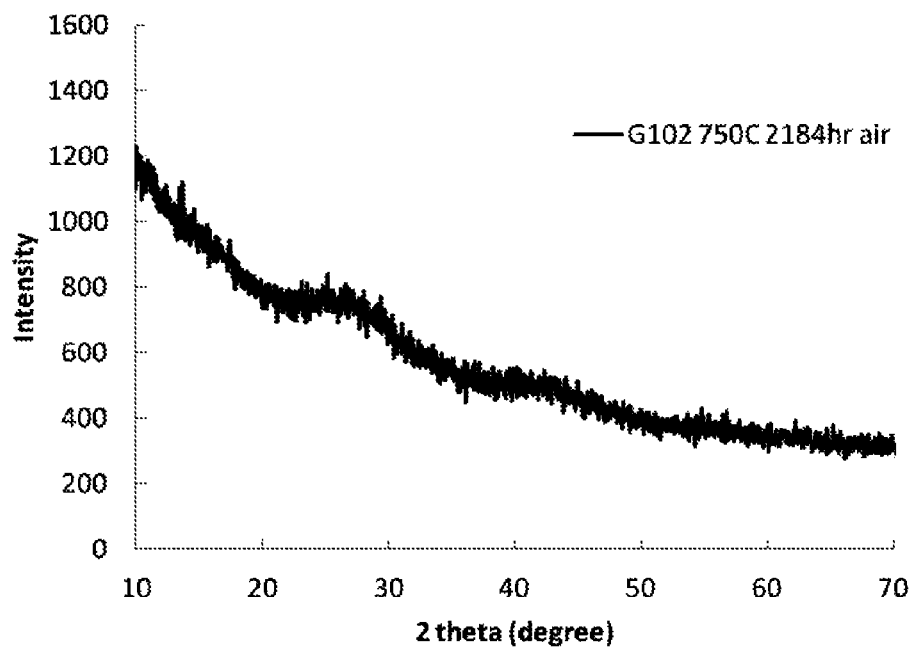
Figure 1C:
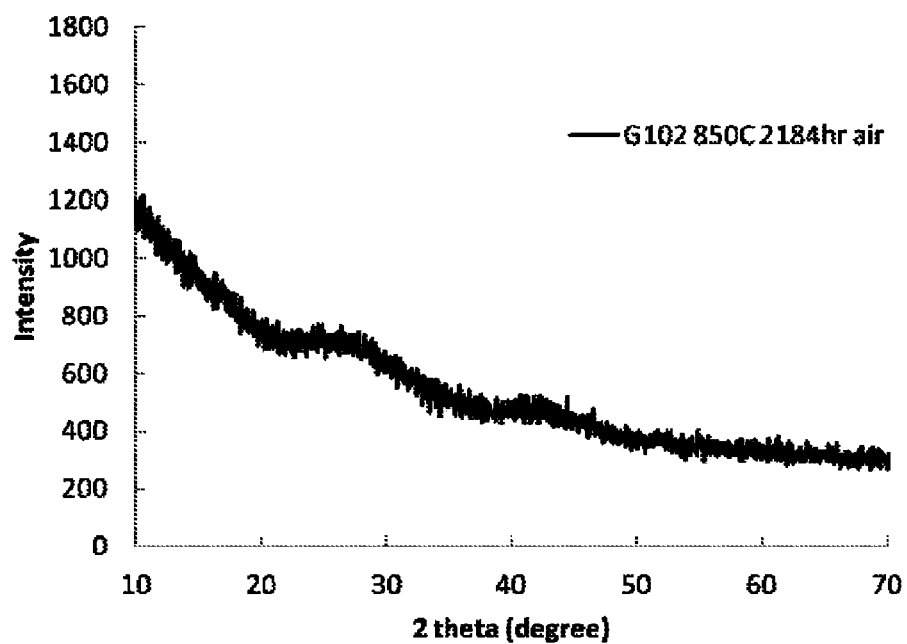
Figure 2A:
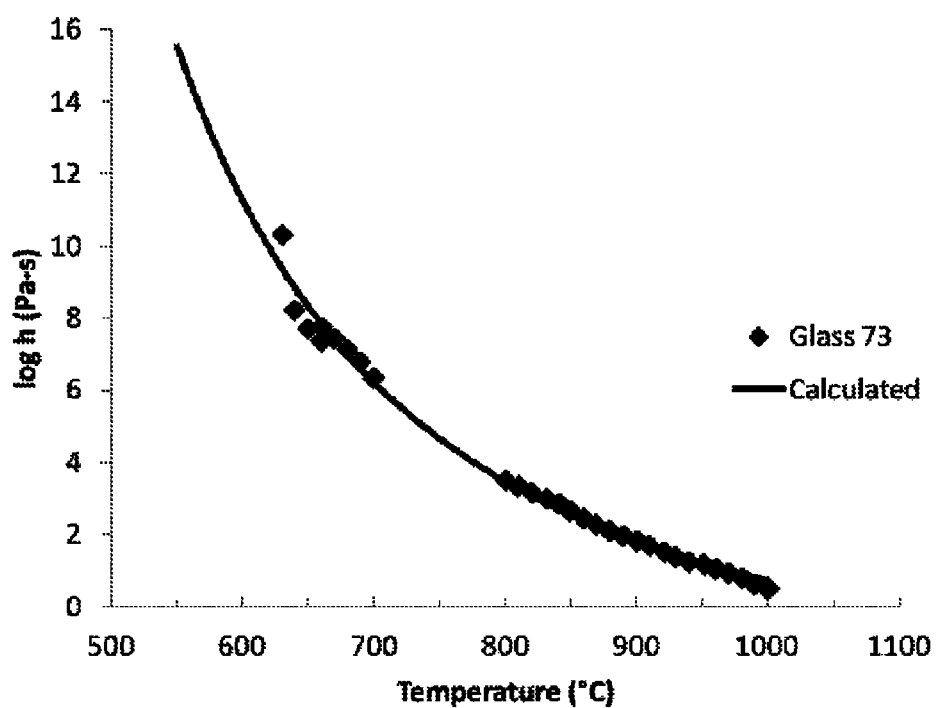
FIGS. 2 and 3 summarize viscosity data collected for certain glass-based materials of the invention.

The configuration of the solid oxide fuel cell of the invention is not narrowly critical to the efficacy of the invention. One exemplary configuration is disclosed in FIGS. 1-3 and described in column 11 of U.S. Pat. No. 7,989,374, the entire disclosure of which is expressly incorporated herein by reference. The invention is further illustrated by the following working examples.

Example 1

Glass compositions 73, 75, 77, and 102 were prepared and CTE values (40-500° C.) determined to be $8.5 \times 10^{-6}$/° C., $8.2 \times 10^{-6}$/° C., $9.3 \times 10^{-6}$/° C., and $7.3 \times 10^{-6}$/° C. respectively. The liquidus temperatures ($T_L$) of Glass 73, 75, and 77 are 800±10° C., 810±10° C., and 810±10° C. respectively. It is hard to determine the $T_L$ of Glass 102 because it does not crystallize upon heat treatments. Thus, these glasses can form viscous seals that do not substantially devitrify under SOFC operational conditions. The X-ray diffraction (XRD) pattern of Glass 102 shown in FIG. 1 after isothermal heat treatments for 2,184 hours at 650° C., 750° C., and 850° C., respectively, shows no evidence of crystalline phases. This exemplary set of embodiments contains 43 to 58 mol % $B_2O_3$, 15 to 25 mol % BaO, 10 to 25 mol % $SiO_2$, 2 to 7 mol % $Al_2O_3$, 2 to 7 mol % CaO, and 2 to 7 mol % SrO, and preferably consists essentially only of these components.

Example 2

Figure 2B:
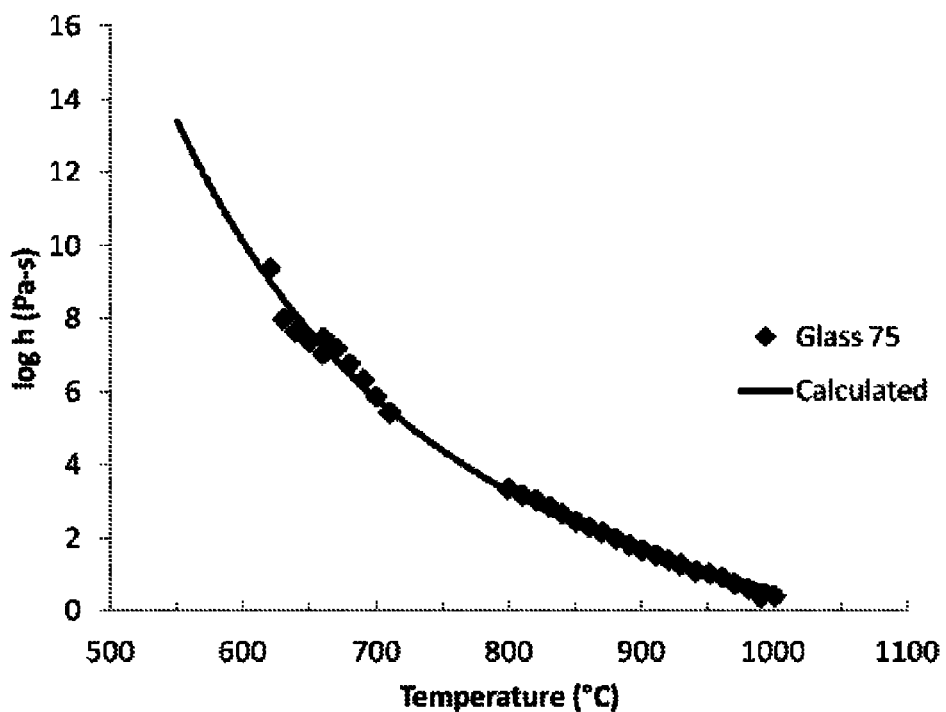
Figure 2C:
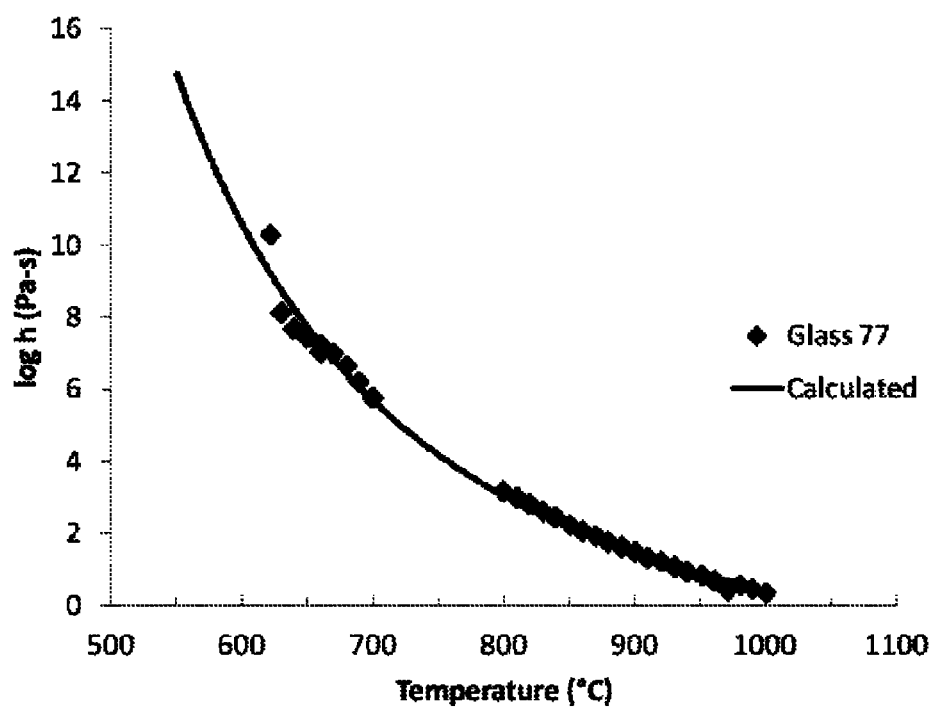
Figure 3A:
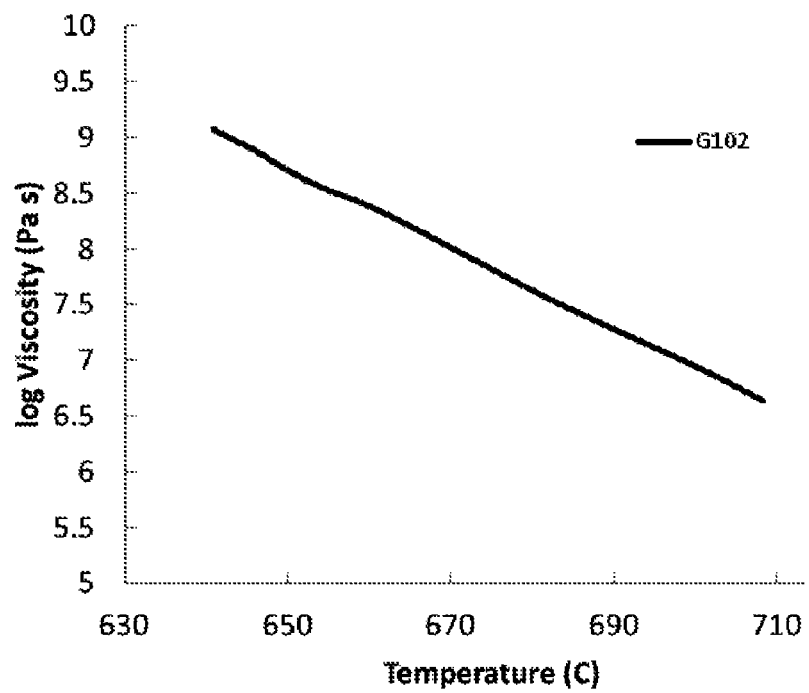
Figure 3B:
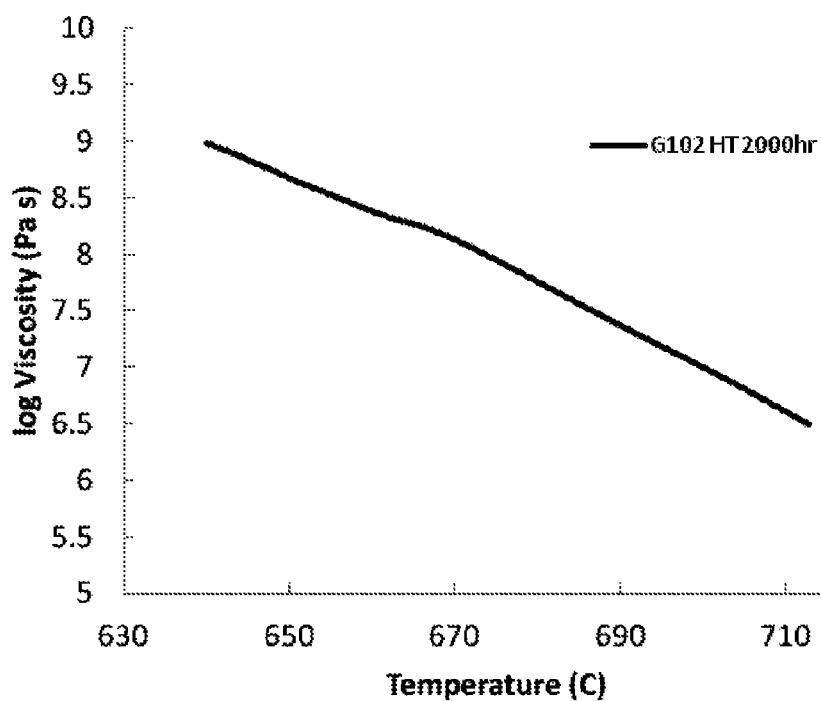

The viscosities of glass melts are measured at intermediate temperatures using a cylinder compression technique with a dynamic-mechanical analyzer and at high temperatures using a rotating spindle technique. FIG. 2 summarizes the viscosity data collected for Glass 73, 75, and 77, with their respective fits to the MYEGA viscosity model. Table 8 shows the isokom data for Glass 73. The Littleton softening point ($10^{6.6}$ Pa·s) is sometimes defined as the temperature at which a glass will flow under its own weight. With this definition, self-healing behavior should be possible at temperatures above about 706° C. FIG. 3 demonstrates that the viscosity of Glass 102 is stable even upon heat treatment at 800° C. for 2000 hours.

TABLE 8

| | Fitting Parameters | | Measured $T_g$(° C.) | Isokom T(° C.), log (η) (Pa · s) | | | | |
|---|---|---|---|---|---|---|---|---|
| | m | $T_g$(° C.) | Dilatometric | 11 | 9 | 6.6 | 4 | 2 |
| Glass 73 | 64.1 | 606 | 624 | 621 | 654 | 706 | 788 | 887 |

Example 3

Figure 4A:
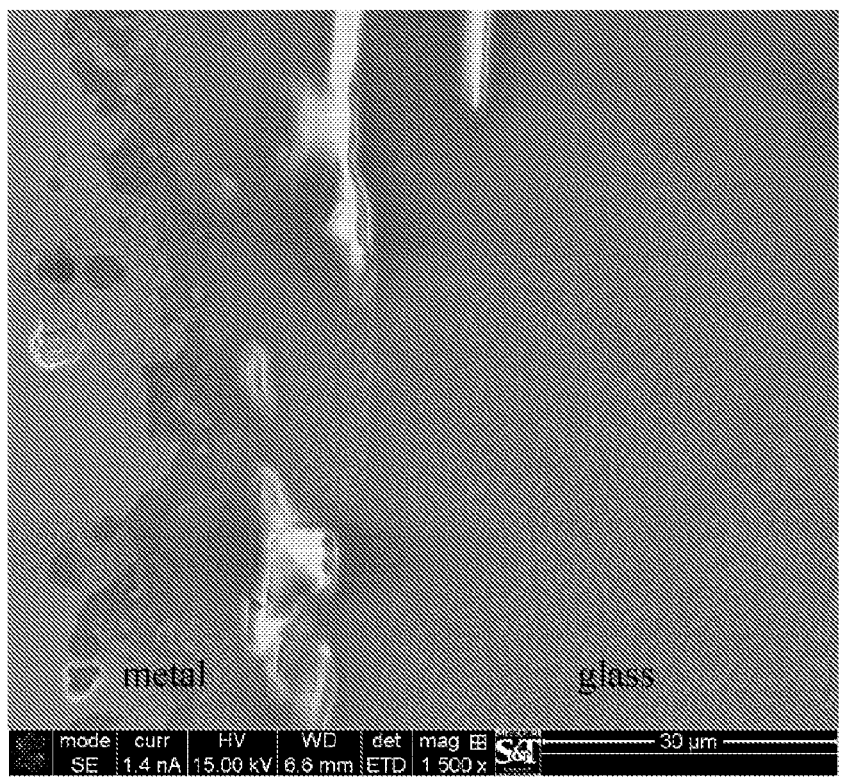
FIG. 4 is a photomicrograph of cross-sections of sandwich seals according to the invention.
Figure 4B:
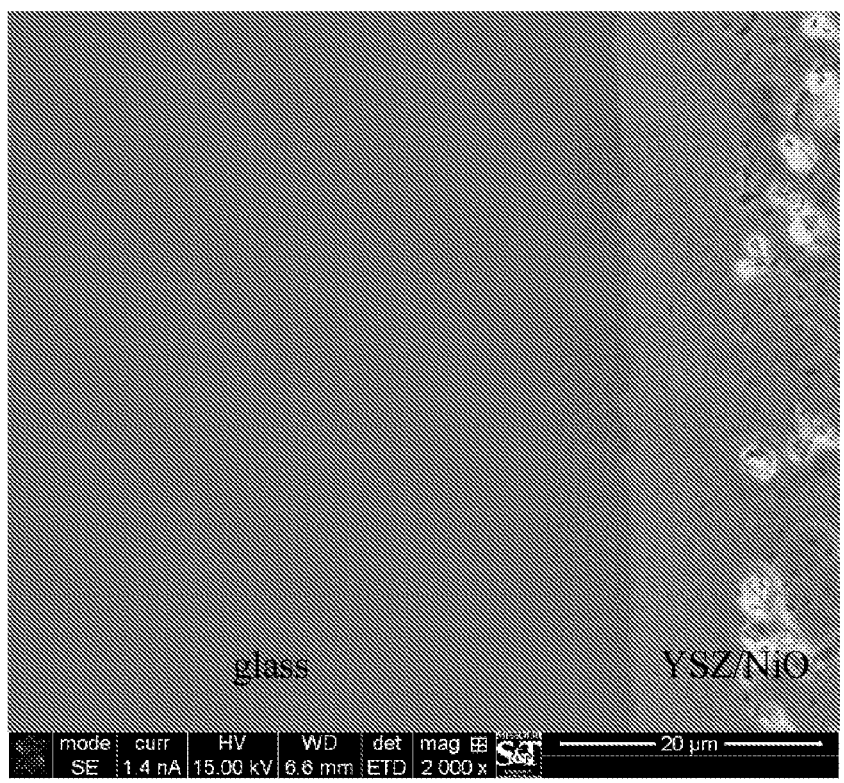

The interfacial reactions of sealing glasses with aluminized 441 stainless steel and a NiO/YSZ bilayer are studied using scanning electron microscopy (SEM) for sandwich seals held in air at 800° C. FIG. 4 shows cross-sections of sandwich seals made with Glass 102 after 2280 hours at 800° C. in air. The cross-sections show excellent wetting and bonding to both aluminized metal and YSZ. The glass is homogenous and there are no crystals in the body of glass. Energy dispersive spectroscopy (EDS) line-scans performed on components sealed according to the invention indicate that there are no elements that have diffused from either metal (SS441) or YSZ, confirming low volatility and good stability in sandwich seals. Al-rich phase ($BaAl_2Si_2O_8$) is observed near the metal interface of the seal with Glass 102. The formation mechanism of these crystals is still not clear. Because of the high aluminum content and their presence only near the metal/glass interface, this phase may form when aluminum is released from the Al-rich scale on the SS441 surface. Glass 102 has good chemical stability in the sandwich seals.

Example 4

Figure 5:
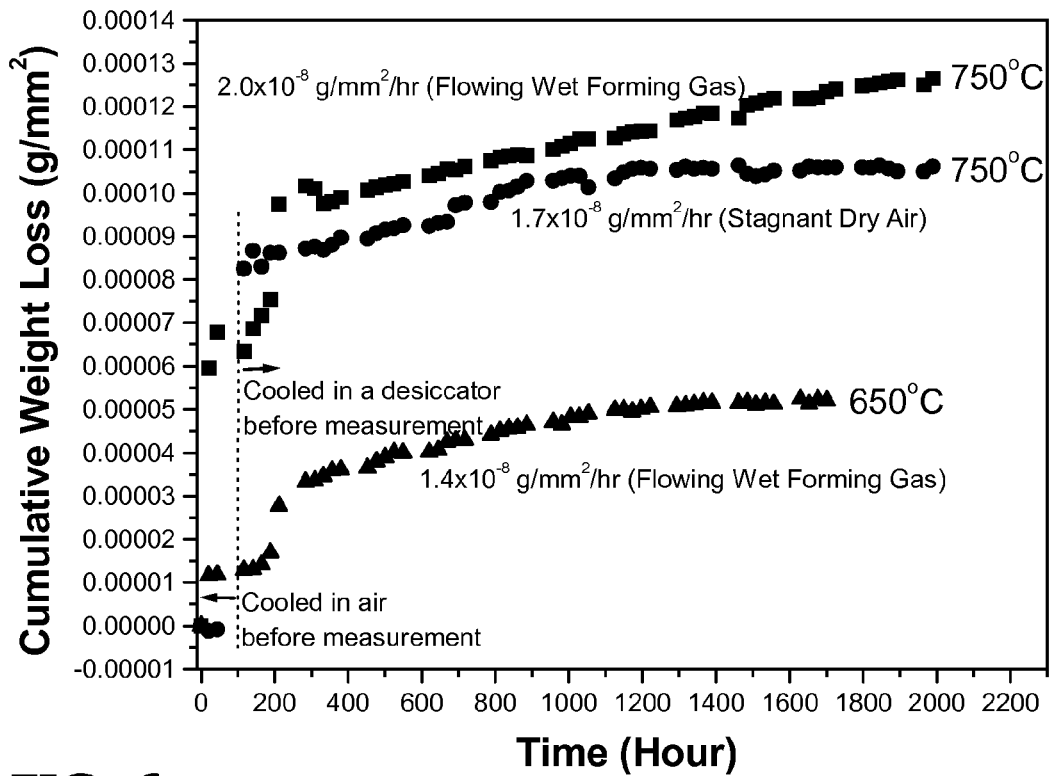
FIGS. 5 and 6 are graphs of volatility data for glass-based materials of the invention.
Figure 6:
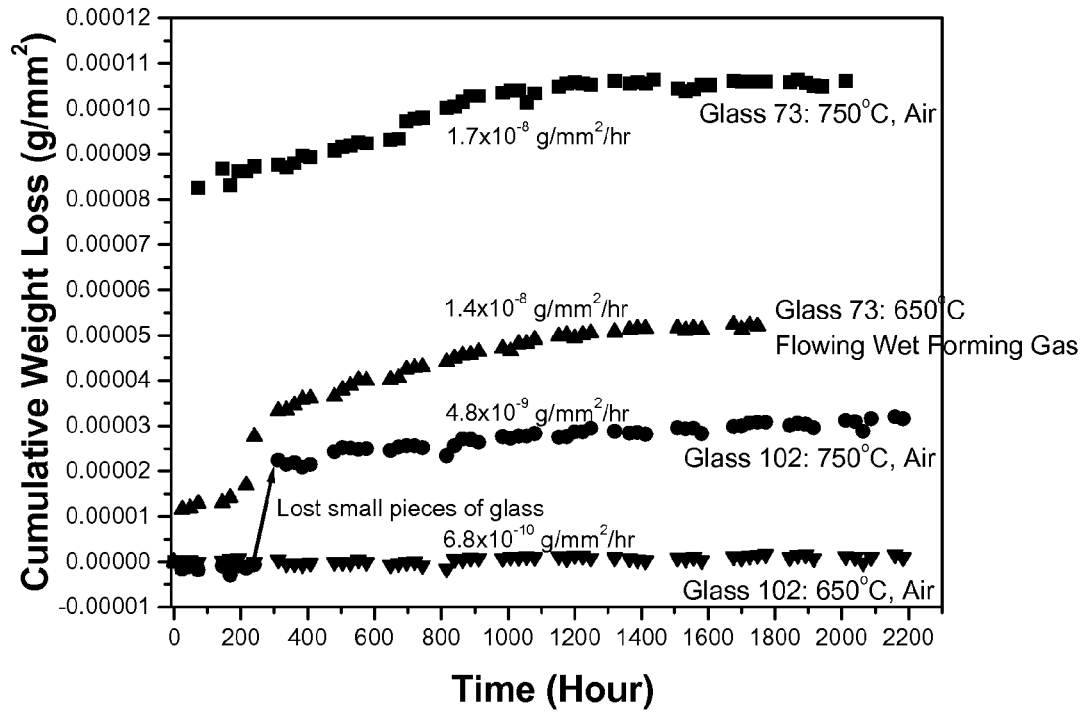

Glass stability against volatilization is determined by weight loss measurements at elevated temperatures. Weight loss measurements are conducted as a function of time (up to 2,000 hours) at 750° C. and 650° C. in flowing wet reducing conditions (5% $H_2$ and 95% $N_2$ with a flow rate of 10 mL/s) and stagnant dry air conditions. The forming gas is bubbled through deionized water held at 70° C. so that the atmosphere contains ~30 vol % water. FIG. 5 shows the linear volatility of Glass 73 in different atmospheres at 750° C. and 650° C. for up to 2,000 hours. The volatilization rates are $2.0 \times 10^{-8}$ g/mm²/hr under flowing wet reducing conditions and $1.7 \times 10^{-8}$ g/mm²/hr under stagnant dry air conditions, respectively at 750° C.; and $1.4 \times 10^{-8}$ g/mm²/hr under flowing wet reducing conditions at 650° C. The inductively coupled plasma mass spectroscopy (ICP-MS) analysis on the water trap downstream from the heat-treated glass samples indicates that boron is the only component volatilized from the glasses. FIG. 6 shows lower volatilization rates (e.g., $4.8 \times 10^{-9}$ g/mm²/hr in stagnant dry air at 750° C.) of Glass 102 than those of Glass 73.

Example 5

Figure 7:
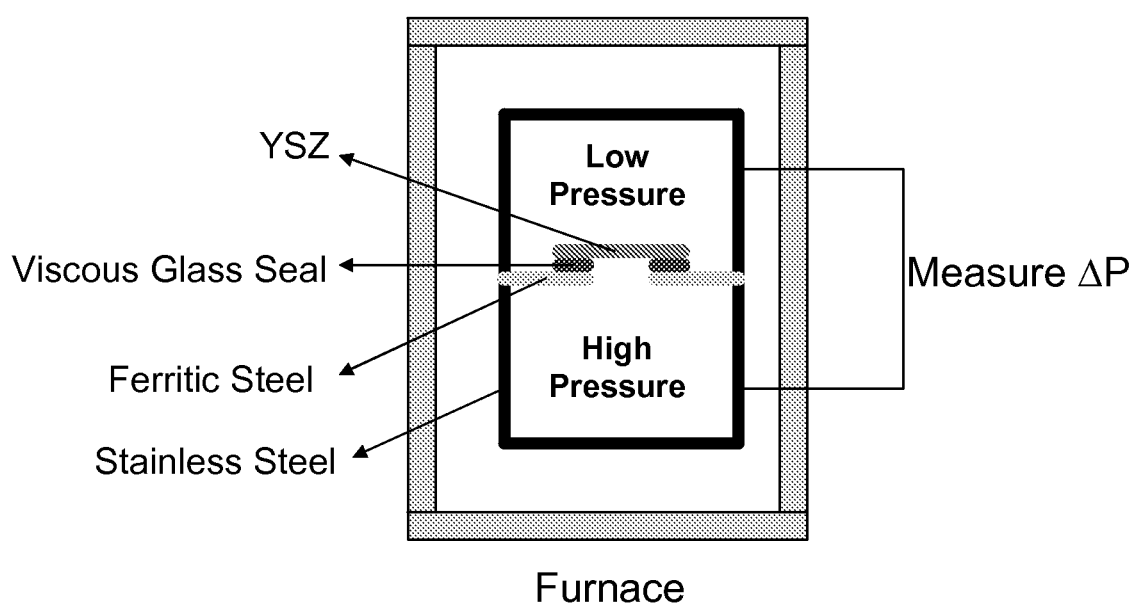
FIG. 7 is a schematic depiction of a test manifold.
Figure 8:
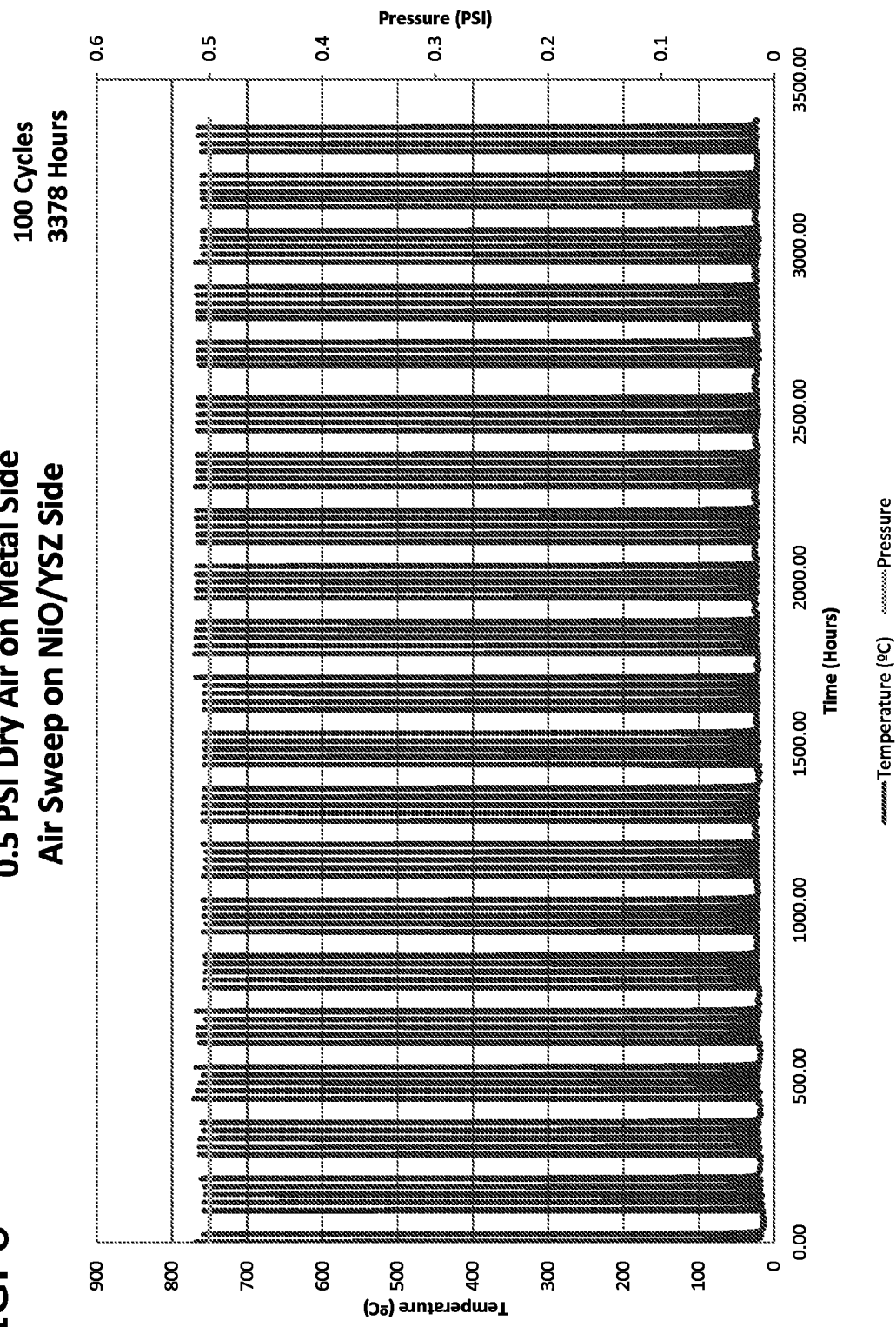
FIGS. 8 and 9 present pressure test data for seals formed according to the invention.
Figure 9:
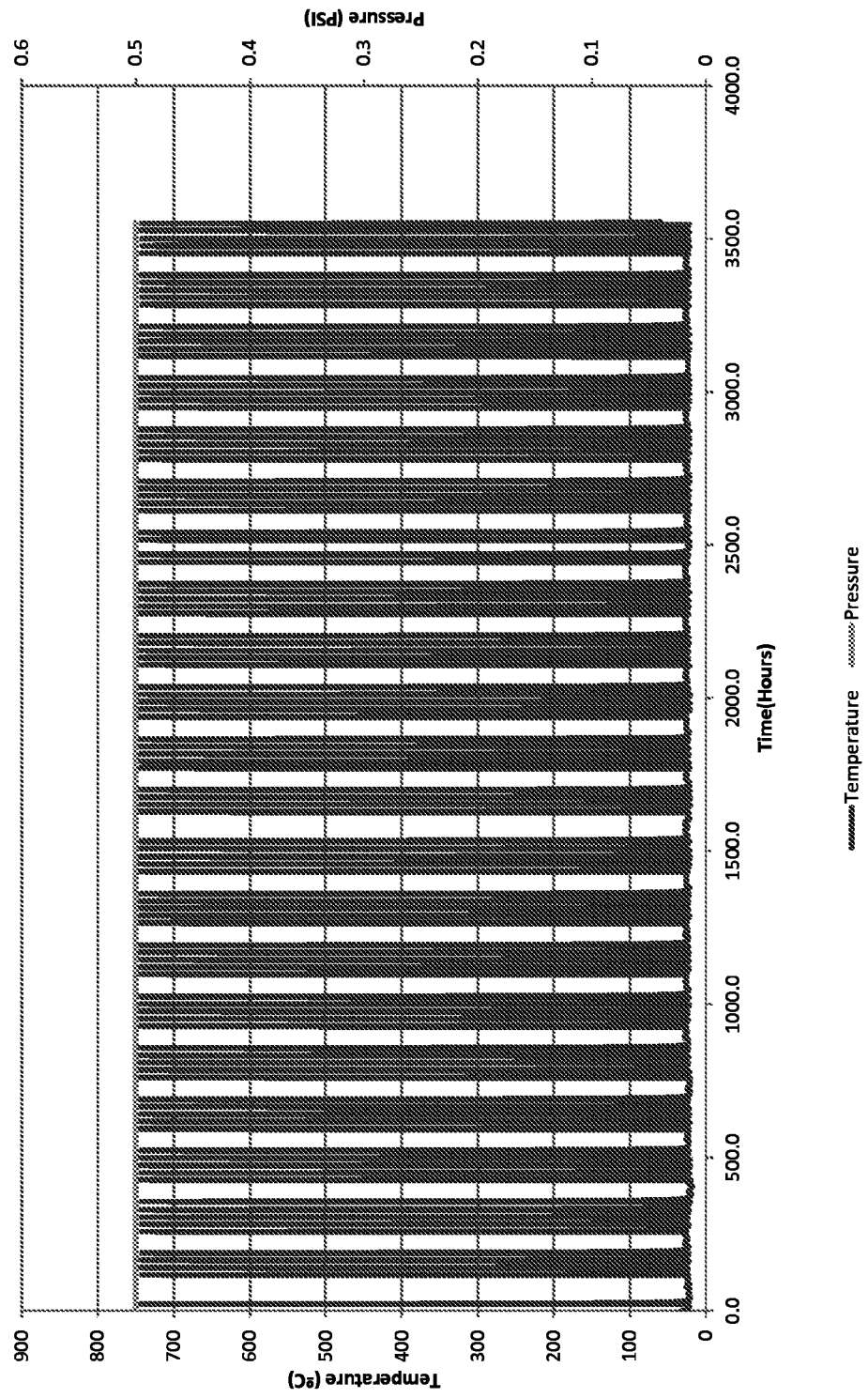

Hermetic seal tests are conducted using a horizontal test manifold (FIG. 7). Coupon sealing is conducted by sandwiching Glass 73 paste between an aluminized SS441 disc (3.2 cm diameter and 1 mm thick) with a central hole (1 cm diameter) and an anode-supported (NiO/YSZ) thin electrolyte (YSZ) bilayer square (2 cm side). To date, the Glass 73 seal has survived 100 thermal cycles (750° C. to room temperature) in dry air at a differential pressure of 0.5 psi (26 torr) over the course of >3,300 hours without failure (FIG. 8). The Glass 73 seal has also survived 103 thermal cycles under wet forming gas (FIG. 9).

Example 6

Self-healing of glass seals that are intentionally cracked by thermal shock is observed in a SS441/Glass 73/YSZ-bilayer sample. The glass in a seal originally found to be hermetic is cracked upon rapid quenching (>25° C./s) from 800° C. When re-heated to 800° C., 750° C., or 725° C. for 2 hours then slowly cooled to room temperature, the seal is again hermetic, holding a 2 psi differential pressure. From the viscosity-temperature curve (FIG. 2a), the viscosity of Glass 73 at 725° C. is $10^{5.9}$ Pa-s, close to the Littleton softening point ($10^{6.6}$ Pa-s). This is the first demonstration of 'crack healing' in a thermally shocked seal.

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above compositions and methods without departing from the scope of the invention, it is intended that all matter contained in the above description and shown in the accompanying drawings shall be interpreted as illustrative and not in a limiting sense.

The invention claimed is:

1. A sealant for forming a seal between at least two solid oxide fuel cell components wherein the sealant comprises a glass material comprising:
   40-60 mol % $B_2O_3$ as a principal glass former,
   10-25 mol % BaO,
   10-25 mol % $SiO_2$,
   2-10 mol % $Al_2O_3$,
   optionally one or more alkaline earth oxides selected from CaO, SrO, and MgO, and
   optionally a transition metal oxide selected from among ZnO, $La_2O_3$, and $ZrO_2$;
   wherein the glass material is substantially alkali-free;
   wherein the glass material contains no more than 15 vol. % crystallized material; and
   wherein the sealant glass material demonstrates viscous self-healing from cracking in an SOFC operational range of 650° C. to 850° C.

2. The sealant of claim 1 wherein the glass material has a cumulative concentration of $Li_2O$, $Na_2O$, and $K_2O$ which is less than 0.5 mol %.

3. The sealant of claim 1 wherein the glass material affirmatively comprises at least two of the alkaline earth oxides selected from CaO, SrO, and MgO.

4. The sealant of claim 1 comprising between 2 and 10 mol % each of one or more of said alkaline earth oxides selected from the group consisting of CaO, SrO, and MgO.

5. The sealant of claim 1 wherein the glass material consists essentially of $B_2O_3$, BaO, $SiO_2$, $Al_2O_3$, and CaO.

6. The sealant of claim 1 wherein the glass material consists essentially of $B_2O_3$, BaO, $SiO_2$, $Al_2O_3$, and ZnO.

7. The sealant of claim 1 wherein the glass material consists essentially of $B_2O_3$, BaO, $SiO_2$, $Al_2O_3$, CaO, and ZnO.

8. The sealant of claim 1 wherein the glass material consists essentially of $B_2O_3$, BaO, $SiO_2$, $Al_2O_3$, CaO, SrO, and ZnO.

9. The sealant of claim 1 wherein the glass material consists essentially of $B_2O_3$, BaO, $SiO_2$, $Al_2O_3$, CaO, and SrO.

10. The sealant of claim 1 wherein the glass material consists essentially of $B_2O_3$, BaO, $SiO_2$, $Al_2O_3$, CaO, SrO, ZnO, and MgO.

11. The sealant of claim 1 affirmatively comprising the transition metal oxide selected from among ZnO, $La_2O_3$, and $ZrO_2$.

12. The sealant of claim 1 wherein the glass consists essentially of 45 mol % $B_2O_3$, 20 mol % BaO, 20 mol % $SiO_2$, 5 mol % $Al_2O_3$, 5 mol % CaO, and 5 mol % SrO.

13. The sealant of claim 1 wherein the glass material consists essentially of 45 mol % $B_2O_3$, 18 mol % BaO, 24 mol % $SiO_2$, 6 mol % $Al_2O_3$, 3.5 mol % CaO, and 3.5 mol % SrO.

14. The sealant of claim 1 wherein the glass material has a glass transition temperature of less than 650° C.

15. The sealant of claim 1 wherein the glass material has a glass transition temperature of less than 650° C., a liquidus temperature of less than 850° C., and a coefficient of thermal expansion between about 7 and about $10 \times 10^{-6}$/° C.

16. The sealant of claim 1 wherein the sealant glass material has a softening temperature below the SOFC operational range of 650° C. to 850° C.

17. The sealant of claim 1 wherein the sealant glass material has a) a liquidus temperature within the SOFC operational range of 650° C. to 850° C., b) a glass transition temperature below the SOFC operational range of 650° C. to 850° C., c) a softening temperature below the SOFC operational range of 650° C. to 850° C., and d) a viscosity at 725° C. of less than $10^{6.6}$ Pa-s.

18. The sealant of claim 1 as a seal in a ferritic steel interconnect.

19. A ferritic steel interconnect in an SOFC comprising the sealant of claim 1 and a stainless steel component.

20. The ferritic steel interconnect of claim 19 comprising the sealant, the stainless steel component, and a yttria-stabilized zirconia component.

21. A solid oxide fuel cell comprising the sealant of claim 1.

* * * * *